United States Patent [19]
Liu

[11] Patent Number: 4,813,028
[45] Date of Patent: Mar. 14, 1989

[54] ACOUSTIC WELL LOGGING METHOD AND APPARATUS

[75] Inventor: Olive Y. Liu, Houston, Tex.

[73] Assignee: Schlumberger Technology Corporation, Houston, Tex.

[21] Appl. No.: 70,470

[22] Filed: Jul. 7, 1987

[51] Int. Cl.$^4$ ............................................. G01V 1/40
[52] U.S. Cl. ....................................... 367/31; 367/25
[58] Field of Search ..................... 367/25, 27, 28, 31, 367/32, 35; 181/104; 310/26

[56] References Cited

U.S. PATENT DOCUMENTS

| | | | |
|---|---|---|---|
| 4,380,806 | 4/1983 | Waters et al. | 367/27 |
| 4,383,308 | 5/1983 | Caldwell | 367/31 |
| 4,432,077 | 2/1984 | Alhilali et al. | 367/31 |
| 4,685,091 | 8/1987 | Chung et al. | 367/31 |
| 4,703,464 | 10/1987 | Howarth et al. | 310/26 |

OTHER PUBLICATIONS

"Full Wave Sonic Logging: A Brief Perspective", 27th Annual SPWLA Logging Symposium (Houst. 6/86) Trans v2.
"Full Wave Acoustic Logging", 24th Annu. SPWLA Logging Symposium (Calgary 6/83) Minear et al., Trans v2.
"Synthetic Microseismograms: Logging in Porous Formations", J. H. Rosenbaum; Geophysics, vol. 39, No. 1, Feb. 1974, pp. 14–32.
"Theory of Propagation of Elastic Waves in a Fluid-Saturated Porous Solid. I. Low-Frequency Range"; M. A. Biot; Journal of the Acoustical Society of America, vol. 28, No. 2, Mar. 1956, pp. 168–191.
"A Study of Sonic Logging in a Cased Borehole", S. K. Chang and A. H. Everhart, SPE Paper 11034 Sep. 26, 1982.
"Rare-Earth Iron 'Square Ring' Dipole Transducer"; S. M. Cohick, J. L. Butler; J. Acoust. Soc. Am 72(2), Aug. 1982, pp. 313–315.
Seismic Waves: Radiation, Transmission, and Attenuation, J. E. White, McGraw Hill, 1965, pp. 130–135.
"Acoustic Multipole Sources in Fluid-Filled Boreholes", A. L. Kurkjian, S. K. Chang; Geophysics, vol. 51, No. 1, Jan. 1986, pp. 148–163.
"Acoustic Waves From an Impulsive Source in a Fluid-Filled Borehole", W. L. Roever et al.; J. Acoust. Soc. Am, vol. 55, No. 6, Jun. 1974, pp. 1144–1157.
Continuous Acoustic Shear Wave Logging; Zemanek et al. SPWLA 25th Annual Loggng Symposium, Jun, 10, 1984, pp. 1–14.

Primary Examiner—Thomas H. Tarcza
Assistant Examiner—Ian J. Lobo
Attorney, Agent, or Firm—Henry N. Garrana; John H. Bouchard

[57] ABSTRACT

An acoustic well logging method and apparatus utilizes a rare earth acoustic transducer to provide low frequency acoustic energy within the borehole, and characteristics of a subsurface geological formation may be obtained, such as the formation permeability by measuring values of the attenuation of the Stoneley waves produced by the rare earth acoustic transducer.

13 Claims, 4 Drawing Sheets

ACOUSTIC WELL LOGGING METHOD AND APPARATUS

FIELD OF THE INVENTION

The invention relates to an acoustic well logging method and apparatus, including the use of a rare earth acoustic transducer.

DESCRIPTION OF THE PRIOR ART

Acoustic well logging techniques and tools are extensively described in the art. Acoustic well logging is used to provide surveys of formations traversed by earth boreholes. In particular, measurements are made of the velocities of acoustic waves to reveal valuable information concerning the types of rocks and the porosity of the rocks in the formation surrounding the borehole. A commonly measured acoustic parameter is the slowness of compressional waves measured in micro-seconds per foot, which is the reciprocal of the velocity of the compressional wave. However, it is desirable that other acoustic wave parameters, such as the slowness of shear waves be determined, as well as other useful parameters, such as the permeability of the formation.

Identifying the compressional wave and measuring its slowness, or the reciprocal of its velocity, is generally not difficult. It is the fastest propagating wave in the formation, is usually non-dispersive, and is the first to reach an array of borehole receivers, when a short burst of acoustic energy from a nearby transmitter propagates through the formation.

Measuring shear slowness, or the reciprocal of the shear wave velocity, is considerably more difficult. Because it propagates more slowly, the shear wave arrives after the compression wave. Therefore, its arrival is typically obscured by compressional energy and slowness determination directly from arrival time is at best difficult and at times impossible. With conventional acoustic logging apparatus, which includes conventional magnetostrictive or piezoelectric acoustic transducers operating in a monopole mode, the shear wave velocity can only be measured if the shear wave velocity is greater than the borehole fluid compressional velocity. Such condition does not exist in all lithologies, such as slow shale, a formation which is less consolidated, whereby the shear wave velocity is slower.

In addition to the burst of acoustic energy producing compressional and shear waves propagating in the formation, some of the transmitted energy never enters the formation, but propagates directly in the fluid as a fluid wave, or mud wave, and other propagations are in the form of guided modes, such as Stoneley waves or as first and second reflected waves, and/or the "leaky modes." The Stoneley mode is routinely observed in field data. In formations wherein the lithology is not well consolidated and the shear waves have relatively low velocities, certain information is readily more available concerning the Stoneley wave, particularly at low acoustic signal frequencies. Furthermore, other indicators of formation characteristics from certain mathematical relationships are best obtained, and are better approximations, when the acoustic signal frequency is low.

With respect to conventional magnetostrictive or piezoelectric acoustic transducers used in acoustic logging apparatus, the magnetostrictive acoustic transducers have the disadvantages of marginal acoustic power output and a relatively high resonance frequency above 20 kHz. While the piezoelectric acoustic transducers do permit the boosting of output power levels, they have only lower resonance frequencies.

It was found that exciting, or operating, piezoelectric acoustic transducers at a lower, or off-resonance frequency, which might provide an improvement for signal-to-noise ratio problems, was not feasible, in that any gains obtainable from lower attenuation were more than outweighed by the loss of power output by the transducer operating at the lower frequency. In connection with any investigations, or logs, of borehole parameters utilizing Stoneley waves, wherein a low frequency response is necessary, it has not been possible to do so with conventional magnetostrictive or piezoelectric acoustic transducers.

Accordingly, prior to the development of the present invention, there has been no acoustic logging method and apparatus which: can be readily used in lithologies wherein the formation is not well consolidated and the shear velocity is relatively slow; permit investigations of borehole parameters based upon low frequency Stoneley waves; and have an acoustic transducer which can operate in either a monopole or dipole mode. Therefore, the art has sought an acoustic logging method and apparatus which: can be used in less consolidated lithologies wherein the shear wave velocity is slower; can be operated at a low frequency so as to permit low frequency measurements of Stoneley waves and other desired measurements; and have a single acoustic transducer which can be operated in either a monopole or dipole mode.

SUMMARY OF THE INVENTION

In accordance with the invention, the foregoing advantages have been achieved through the present acoustic logging method and apparatus. The method of the present invention for determining the permeability of a subsurface geological formation traversed by a borehole, includes the steps of: passing a logging tool through the borehole, the logging tool having associated therewith a rare earth acoustic transducer; generating low frequency acoustic energy at a point in the borehole with the rare earth acoustic transducer; receiving acoustic signals at a plurality of receiver stations spaced one from the other and from the rare earth acoustic transducer; producing full waveforms of the received signals including shear waves and Stoneley waves for the point in the borehole; measuring values of the attenuation of the Stoneley wave and values of the velocity of the shear wave for the point in the borehole; and combining the measured values of the Stoneley wave attenuation and the shear wave velocity with other known measured values of borehole characteristics to obtain the formation permeability of the point in the borehole. A feature of the present invention may include the step of generating the low frequency acoustic energy at the point in the borehole by operating the rare earth acoustic transducer in a monopole mode, when the shear wave velocity is greater than the borehole fluid compressional velocity, to measure values of the velocity of the shear wave.

Another feature of the present invention, is the step of generating the low frequency acoustic energy at the point in the borehole by operating the rare earth acoustic transducer in a dipole mode, when the shear wave velocity is less than the borehole fluid compressional velocity, to measure values of the velocity of the shear waves.

In accordance with the present invention, a method for obtaining waveforms indicative of characteristics of a subsurface geological formation traversed by a borehole, includes the steps of: passing a logging tool through the borehole, the logging tool having associated therewith a rare earth acoustic transducer; generating low frequency acoustic energy at a point along the borehole with the rare earth acoustic transducer; operating the rare earth acoustic transducer at the point in an alternating monopole and dipole mode; receiving acoustic signals at a plurality of receiver stations spaced one from the other and from the rare earth acoustic transducer; producing full waveforms of the received signals; and recording the full waveforms, whereby the wave forms may be analyzed to determine characteristics of the formation adjacent the point in the borehole.

In accordance with the present invention, an acoustic logging tool for determining characteristics of a subsurface geological formation traversed by a borehole, may include: a sonde having means for generating acoustic energy at a point in the borehole, the acoustic generating means being a rare earth acoustic transducer; and means for receiving acoustic signals at a plurality of receiver stations spaced one from the other and from the rare earth acoustic transducer.

The acoustic logging method and apparatus of the present invention, when compared with previously proposed prior art acoustic logging methods and apparatus, has the advantages of: being able to transmit sonic energy in either a monopole or dipole mode; can be used to measure shear wave velocity and attenuation in slow lithology; can measure shear wave velocity and attenuation at two azimuthal directions so as to identify formation anisotropy; is able to utilize lower signal frequencies which provide enhanced measurements of characteristics of Stoneley waves, and other measurements.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figures 1, 2:
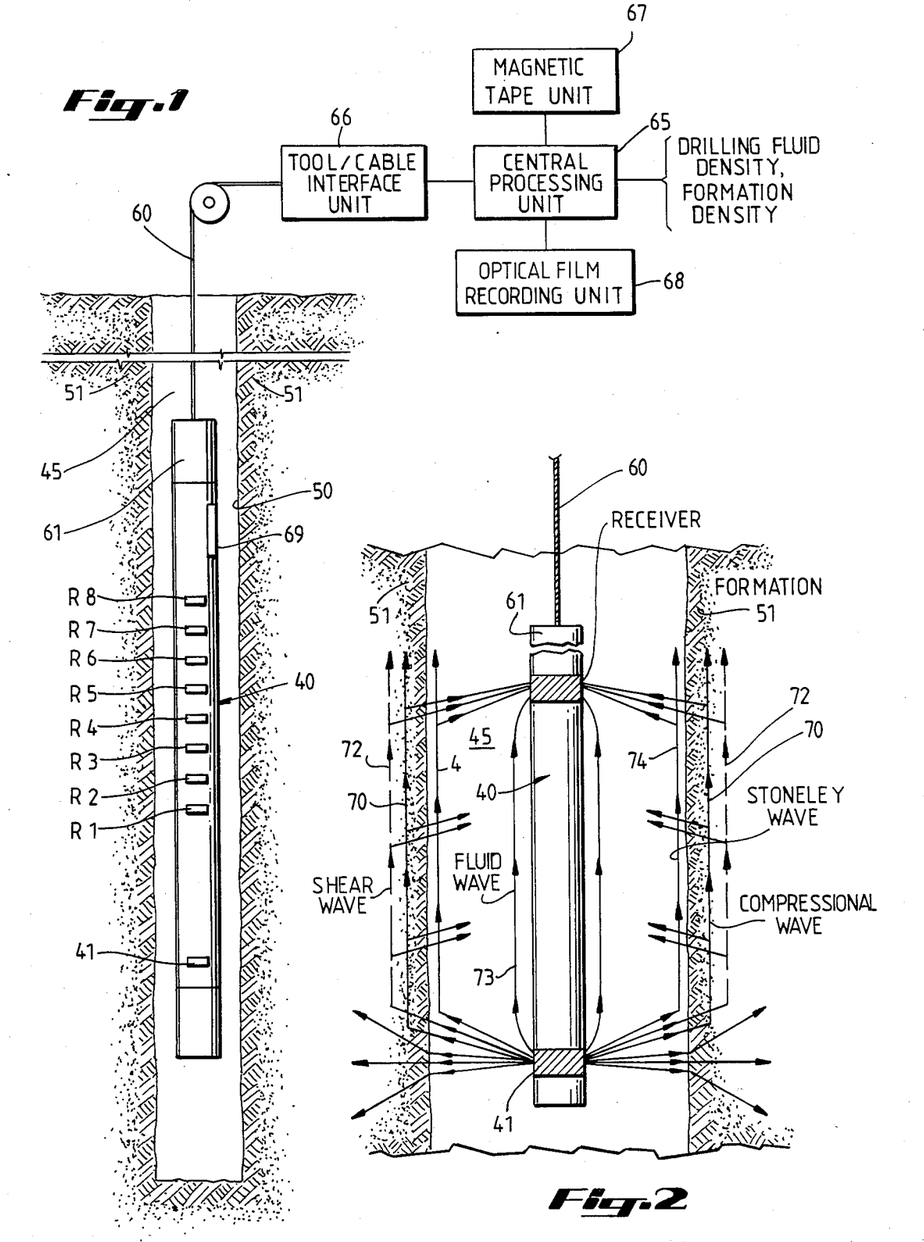
FIG. 1 is a figurative illustration of a system, including an acoustic logging apparatus in accordance with the present invention.
FIG. 2 is a ray diagram depicting propagation of acoustic waves from a monopole transmitter in a borehole and through adjacent subsurface formations.

In FIG. 1, a schematic view of a suitable logging tool, or sonde, 40, is shown to include an acoustic transducer, or transmitter, 41, used to generate acoustic energy in the form of sonic pulses in the borehole fluid within the borehole 50 and the surrounding formation 51; and a plurality of additional acoustic transducers, or receivers, R1 through R8, inclusive, may be provided and utilized as sonic pulse receivers for reception of acoustic signals propagating through the formation 51 and through the borehole 50. Acoustic transducer 41 is spaced from the near receiver R1, a suitable distance, such as from 7 to 11 feet, and each of the receivers R1-R8 are likewise spaced a suitable distance apart, typically 4 to 8 inches apart. Bow-spring centralizers (not shown) may be utilized to keep the sonde 40 centered in the borehole 50. Additionally, more than one transmitter with one or more receivers may be used to provide the necessary two or more receiver spacings.

Acoustic transducer 41 is preferably a rare earth acoustic transducer 41. The use of the term "rare earth" encompasses a group of transition metals known as the Lanthanide series and are found in the periodic table as the 15 elements starting with Lanthanum, atomic number 57, and ending with Lutetium, atomic number 71. Some are magnetic, some are not; some are magnetostrictive, some are not; and some have magnetic anisotropy, some do not. It has been determined by others that the magnetostrictive properties of the rare earths are exhibited at temperatures suitable for use in downhole logging tools when alloyed into binary alloys of Iron (Fe) with Samarium (Sm), Terbium (Tb), or Dysprosium (Dy), in the approximate ratio $ReFe_2$. The acoustic velocities of these alloys are about half those of other magnetostrictive and piezoelectric transducer materials, so it is possible to obtain lower frequencies without increasing transducer size. Preferably, rare earth acoustic transducer 41, in accordance with the present invention, utilizes an optimized pseudo-binary alloy of the form $Tb_{1-x}Dy_xFe_2$ (hereinafter referred to as "Terfenol-D") for the manufacture of rare earth acoustic transducer 41. Preferably, rare earth acoustic transducer 41 includes four Terfenol-D rods joined at their ends to form a "square ring" transducer. The four Terfenol-D rods are attached to four rounded pistons, and such a transducer is capable of operating in either a monopole or dipole mode. This square ring design, exploiting the properties of the rare-earth material Terfenol-D, results in a compact tranducer which operates at a low resonance frequency.

It should of course be understood that the rare earth acoustic transducer 41 must be of a size which permits its use within sonde 40, whereby the diameter of rare earth acoustic transducer 41 should be on the order of 2¾ inches in diameter. It should be readily apparent to those of ordinary skill in the art that other rare earth alloys may be utilized in the manufacture of rare earth acoustic transducer 41, provided such transducer has the requisite power output and is capable of operation at a low resonance frequency, typically on the order of below 10 kHz, and preferably in the range of below 5 kHz. For example, other viable rare earth alloys with materials such as Cobalt may be employed in the construction of acoustic transducers. These materials exhibit desirable properties such as high temperature rating and high magnetic coercive force. A wide range of transducer geometries can be realized with these materials, including bender type transducers (employing differential strains in an arrangement which provides mechanical amplification of the resultant displacement) and electro-dynamic transducers (in which the rare-earth material is the source of a high density magnetic flux used to apply force to a coil carrying electrical current). These and other chemical (containing at least one lanthanide series element) and mechanical configurations are usable as rare earth transducers.

Several times each second, on command from the surface control and processing equipment, a particular transducer and receiver combination is selected and the transducer is excited, or operated. Commands are sent down the wire line cable 60 supporting the logging tool, or sonde 40 in the borehole 50, and are decoded in an electronic cartridge 61 interconnecting the cable 60 and the tool or sonde 40. The received waveforms for each firing is amplified in the cartridge 61 and transmitted up the cable 60 to the surface equipment.

The mode of transmission may be analog or digital. If it is digital, the appified waveform values are sampled at a regular prescribed rate, typically 100,000 to 200,000 times per second, then digitized in the cartridge 61. They are then telemetered up the cable 60 as a sequence of binary numbers. If it is analog, the amplified waveforms are passed directly up the cable 60 and digitized in the surface equipment. The surface equipment typically includes a central processing unit 65, a tool/cable interface unit 66, a magnetic tape recording unit 67, an optical film recording unit 68, and other conventional equipment. The program executing in the central processing unit 65 is responsible for issuing commands to the tool through the tool/cable interface unit 66 for selecting the transducer 41-receiver combination, and for firing the acoustic transducer 41.

Typically, the acoustic transducer 41, in the arrangement shown, may be fired eight times to provide a suite of eight full wave signals. With the first firing of the acoustic transducer 41, the receiver R1 is connected; for the second firing of the acoustic transducer 41, the receiver R2 is connected; and so on. Preferably, a simultaneous downhole digitization of the waveform signals from all receivers R1-R8 is performed. Sonic receivers R1-R8 are preferably sonic receivers capable of receiving both monopole and dipole signals dependent upon which mode the transducer 41 is fired.

The central processing unit 65 also retrieves the waveform data, either from a telemetry module in the tool-cable interface unit 66 if digitization is done downhole, or from a digitizer module in the tool/cable interface unit 66, if analog transmission is used. In either case, the waveform data is recorded using the magnetic tape recording unit 67. The program may actually process the waveform data at the well site utilizing the method described hereinafter and record the results using the optical film recording unit 68. Otherwise, processing may be performed by a central processing unit located in a remote center using the tapes made of the waveform data.

In addition to the sonic receivers R1-R8 utilized to detect the appearance of propagating sonic signals through the formation and through the borehole, there may also be provided in the sonde 40 apparatus 69 for measuring the travel time of sonic energy through the drilling mud, or borehole fluid, as the logging tool, or sonde, 40, traverses the borehole 50. The operation of apparatus 69 is under control of the central processing unit 65. More specifically, the apparatus 69 includes a transmitter and receiver spaced one from the other and having interposed therebetween the drilling mud. The time of firing the transmitter and the onset of a sonic signal at the receiver are utilized by the central processing unit in determining the slowness of the drilling mud, which is the reciprocal of the borehole fluid compressional velocity. The firing of the transmitter and the apparatus 69 is synchronized with the firing of the acoustic transducer 41, as is conventional in the art.

The performance of the method of the invention at the well site or at a remote location is optional. In either case, in order to conduct the method of the present invention, as will hereinafter be described in further detail, additional values of borehole characteristics, or borehole parameters, are inputted to the central processing unit 65, in a conventional manner. As will be hereinafter described in greater detail, these additional borehole characteristic values may be obtained either immediately preceding or subsequent to the acquisition of the sonic data by way of the logging tool, or sonde 40. The determination of the drilling fluid density may be acquired preferably during the course of conducting the logging operations with the sonde 40.

When the acoustic transducer 41 is excited in a monopole mode, it emits an oscillatory burst of acoustic energy. This burst begins to propagate more or less spherically outward from the acoustic transducer 41 as a compressional (pressure) wave in the borehole fluid, or drilling mud 45. As the wave passes into the formation 51, its direction of propagation changes as the refracted ray diagrams of FIG. 2 indicate, and its speed increases to that of sound in the specific rock composition. At the same time, some of the energy is converted into shear waves propagating in the formation, 51, but at a velocity lower than compressional. In addition, some of the transmitted energy never enters the formation, but propagates directly in the fluid 45 as a fluid wave, or mud wave, and other propagations are in the form of guided modes, such as Stoneley waves or as first and second reflected waves, and/or the "leaky modes."

Figure 3:
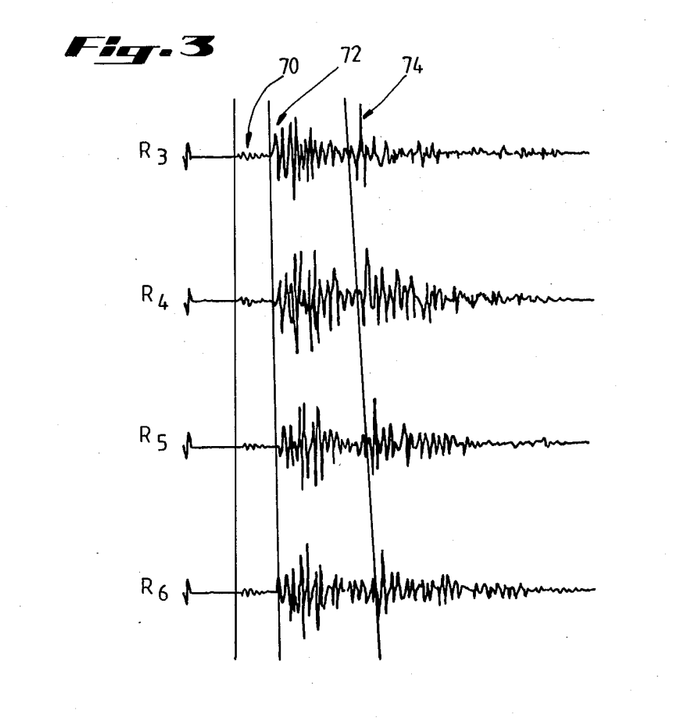
FIG. 3 illustrates a selected suite of typical wave forms produced at each of a series of spaced receivers in response to the generation of a pulse of sonic energy from a monopole transmitter.

There are therefore, several ways for acoustic energy to propagate from rare earth acoustic transducer 41 to the receivers R1-R8, as shown in FIG. 2, i.e., through fluid 45, then formation 51, then fluid 45, all as compressional waves 70; through fluid 45, as compressional, then formation 51, as shear waves 72, then fluid 45, as compressional; completely through fluid 45, as fluid waves 73, and finally as guided waves, such as the higher mode waves represented by the Stoneley wave 74. The formation compressional wave, 70 travels the fastest and thus is the first to arrive at the receivers. The Stoneley wave 74 arrives later and the shear wave 72 arrives somewhere between the compressional wave 70 and the Stoneley wave 74. As shown in FIG. 3, firing of the rare earth acoustic transducer 41 gives rise to a suite of eight full waveforms, appearing at each of the receiving transducers, or receivers, R1-R8, and the waveforms are simultaneously recorded. In FIG. 3, four of the waveforms are illustrated. For the monopole mode, the waveforms of FIG. 3 are labeled to show typical compressional waves 70, shear waves 72, and Stoneley waves 74.

Figure 4:
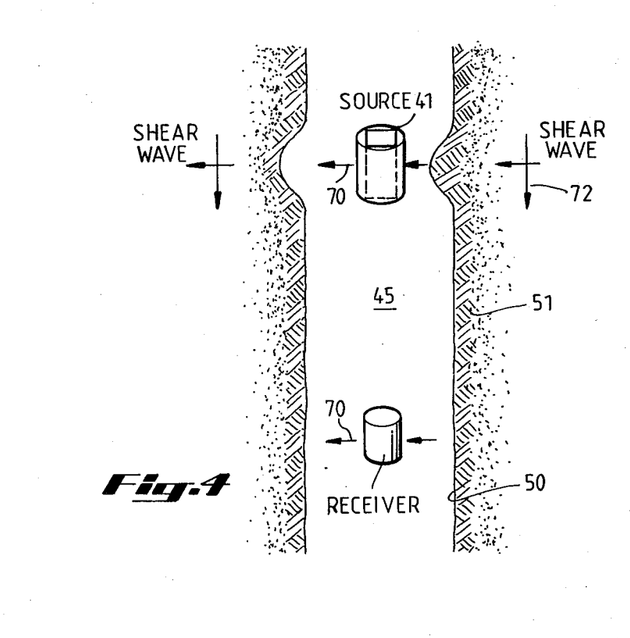
FIG. 4 is a schematic ray diagram depicting propagation of acoustic waves from a dipole transmitter in a borehole and through adjacent subsurface formations.
Figure 5:
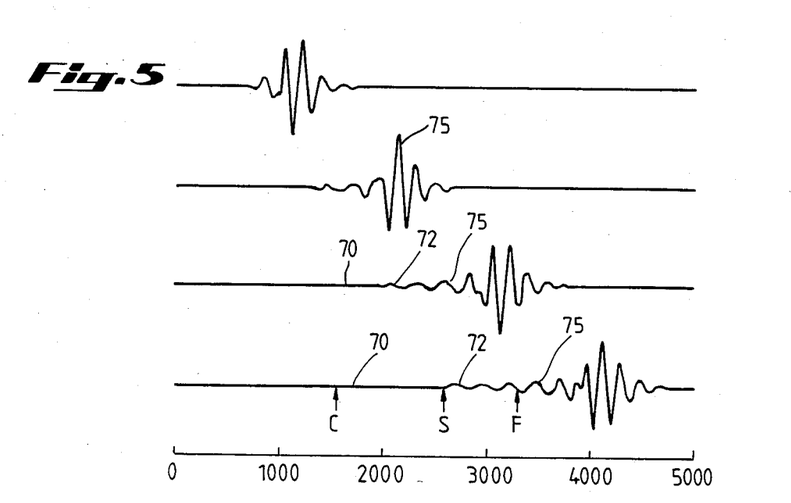
FIG. 5 illustrates a selected suite of typical waveforms produced at each of a series of spaced receivers in response to the generation of a pulse of sonic energy from a dipole transmitter.

When the acoustic transducer, 41, is excited in a dipole mode, it also emits an oscillatory burst of acoustic energy. As shown in FIG. 4, an asymmetric compressional (pressure) wave 70 from the transducer 41, travels in the borehole fluid or drilling mud, 45, to the formation 51. As it passes into the formation, 51, a shear wave 72 is generated which travels along the borehole wall 50. The shear wave 72 motion in formation 51 is asymmetric. As the shear wave 72 propagates along the borehole 50, it induces an asymmetric compressional wave 70 in the borehole fluid, 45, which is received by the receivers, R1-R8. With the acoustic transducer 41 operating in the dipole mode, the waveforms present would be as shown in FIG. 5, wherein the compressional wave 70 is insignificant, and the shear waves 72 and flexural waves 75, or flexural mode, dominates the received signals.

The permeability (k) of formation 51 is known to be related to the relative motion between the solid frame, or skeleton, of the porous rock forming formation 51, and the viscous fluid, contained in the pore space of the porous rock of formation 51. In the low frequency range, typically below 10 kHz, the fluid flow in the pores of the rock of formation 51, follows Poiseuelle's law, and the attenuation of shear waves ($a_s$) in the formation are directly proportional to the permeability (k). The attenuation of shear waves, 72, ($a_s$) may be expressed by the following equation:

$$a_s = \frac{2\pi^2}{V_s} \frac{\rho_f}{\rho_b} \frac{K\rho_f}{n} f^2 \qquad (1)$$

wherein: $V_s$ is the shear wave velocity; $\rho_f$ is the density of the fluid in the pore space; $\rho_b$ is the fluid saturated formation density; k is the formation permeability; n is the pore fluid viscosity; and f is the frequency of the shear wave being measured. As previously described, the shear wave velocity ($V_s$) may be measured from a rare earth acoustic transducer 41 operating in a monopole mode when the shear velocity ($V_s$) is greater than the borehole fluid compressional velocity. Because of the large interference from the flexural mode and the borehole geometry, it is typically more difficult to directly measure $a_s$.

In order for the foregoing equation to apply, as taught by Boit in his article "Theory of Propagation of Elastic Waves in Fluid-Saturated Porous Solid. I. Low-Frequency Range", The Journal of the Acoustical Society of America, Volume 28, No. 2, pp. 168-191, (1956), the low-frequency range is defined by the expression:

$$f \leq .15 \left( \frac{h\phi}{2\pi \rho_f K} \right) \qquad (2)$$

wherein: n is the viscosity; $\phi$ is the porosity; $\rho_f$ is the pore fluid density and k is the formation permeability. As an example, for water saturated Berea sandstone formations, representative values for the parameters of the foregoing equation (2) would be n=0.01, k=$2 \times 10^{-9}$, $\phi$=0.19 and $\rho_f$=1.0, whereby the maximum frequency (f) for fluid flow in accordance with Poiseuelle's law would be 22.68 kHz. For a high porosity formation, wherein $\phi$ may equal 0.26 and a high formation permeability (k) equal to 1,000 milidarcies, the cutoff frequency for Poiseuelle flow would be 6.2 kHz. That cutoff frequency (f) is readily available by utilizing a rare earth acoustic transducer, 41, as previously described.

The attenuation of low frequency Stoneley waves ($a_{st}$) is related to the shear wave attenuation ($a_s$), by the following equation:

$$a_{st} = a_s \frac{B}{B + G} \qquad (3)$$

wherein: B is the borehole fluid bulk modulus and G is formation shear modulus. As is known in the art, the fluid bulk modulus (B) may be determined in accordance with the following equation:

$$B = V_{mud}^2 \cdot \rho_{mud} \qquad (4)$$

wherein: $V_{mud}$ is the borehole fluid compressional velocity; and $\rho_{mud}$ is the density of the borehole fluid. The formation shear modulus (G) may be determined in accordance with the following equation:

$$G = V_s^2 \cdot \rho_b \qquad (5)$$

wherein: $V_s$ is the shear wave velocity; and $\rho_b$ is the fluid saturated formation density.

As is known in the art, the borehole fluid bulk modulus (B) and the formation shear modulus (G) may be readily computed in accordance with the foregoing equations, (4) and (5), in a conventional manner. It should be noted that the foregoing equation (3) which defines the attenuation of low frequency Stoneley waves is also applicable for the low frequency range previously defined by equation (2). Thus, as will be hereinafter described in greater detail, it may seen that by measuring the attenuation, obtaining values of the attenuation of the Stoneley wave, ($a_{st}$) and having computed values for the borehole fluid bulk modulus (B) and shear modulus (G), a value may be obtained and substituted into equation (1) previously described.

Insofar as the pore fluid density $\rho_f$, the borehole fluid density $\rho_{mud}$, fluid saturated formation density $\rho_b$, acoustic signal frequency, f, and pore fluid viscosity, n, are either known values, or values, which can be obtained in a conventional manner, equation (1) may then be solved to obtain the formation permeabiility k, as will be hereinafter described in greater detail.

The method of the present invention for determining the permeability (k) of a subsurface geological formation 51 traversed by a borehole 50, thus comprises the following steps. Logging tool, or sonde, 40, is passed through the borehole 50, logging tool 40 having associated therewith, a rare earth acoustic transducer 41, as previously described. Low frequency acoustic energy is generated at a point in the borehole 50 by operation, or excitation, of rare earth acoustic transducer 41. The acoustic signals are received by receivers R1-R8, and full waveforms of the received signals are produced in a conventional manner, including shear waves and Stoneley waves. Values of the attenuation ($a_{st}$) of the Stoneley wave and values of the velocity of the shear wave of the particular point in the borehole being investigated are then measured. The measured values of the Stoneley wave attenuation and the shear wave velocity are then combined with other known measured values of borehole characteristics whereby the formation permeability of the point in the borehole under investigation is obtained. The measured values, of the Stoneley wave attenuation and the shear wave velocity are combined with other known measured values of: borehole fluid bulk modulus (B); shear modulus (G); pore fluid density ($\rho_f$); fluid saturated formation density ($\rho_b$); borehole fluid density ($\rho_{mud}$); acoustic signal frequency (f); and pore fluid viscosity (n), in accordance with the equations (1) and (3) previously described. Other than the measured values of the Stoneley wave attenuation ($a_{st}$) and the shear wave velocity ($V_s$), and the formation permeability (k) being obtained, all the other borehole characteristics are either known for the particular borehole 51, or are obtained in a conventional manner.

The low frequency acoustic energy generated at a particular point in the borehole 50 may be generated by operating the rare earth acoustic transducer 41 in either a monopole or dipole mode, dependent upon the shear wave velocity ($V_s$). When the shear wave velocity ($V_s$) is greater than the borehole fluid compressional velocity ($V_{mud}$), the rare earth acoustic transducer 41 may be operated in either a monopole or dipole mode to measure values of the velocity and attenuation of the shear wave. When the shear wave velocity ($V_s$) is less than the borehole fluid compressional velocity ($V_{mud}$), the low frequency acoustic energy may be generated by operating the rare earth acoustic transducer 41 in only a dipole mode.

It should be noted that waveforms indicative of characteristics of the subsurface geological formation 51 may also be obtained by passing the previously described logging tool 40 through the borehole 50, and generating low frequency acoustic energy at a point in the borehole 50 with the rare earth acoustic transducer 41. The rare earth acoustic transducer 41 may be operated in an alternating monopole and dipole mode to provide alternating compressional and shear excitation in the borehole 50, during a single passing of the logging tool 40 through borehole 50. The particular acoustic signals are likewise received at the receiver stations R1–R8, and full waveforms of the received signals may be produced. The full waveforms may then be recorded, whereby the waveforms may be analyzed to determine characteristics of the formation adjacent the point in the borehole under investigation. Alternatively, the full waveforms may be analyzed prior to being recorded. By alternating the operation of the rare earth acoustic transducer 41 between a monopole mode and a dipole mode, conventional continuous compressional wave and Stoneley wave or shear wave slowness logs may be prepared from the waveforms obtained from the previously described method.

Figure 6:
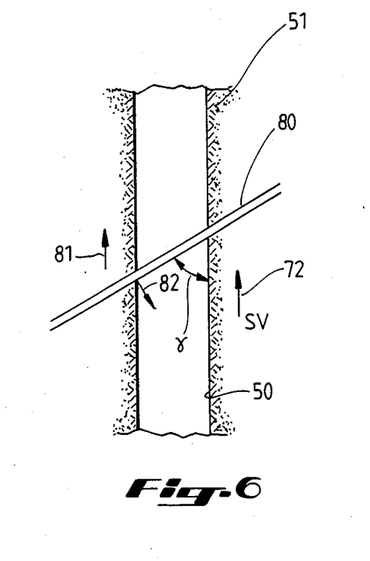
FIG. 6 illustrates a thin bed or fracture in a subsurface geological formation traversed by a borehole.
Figure 7:
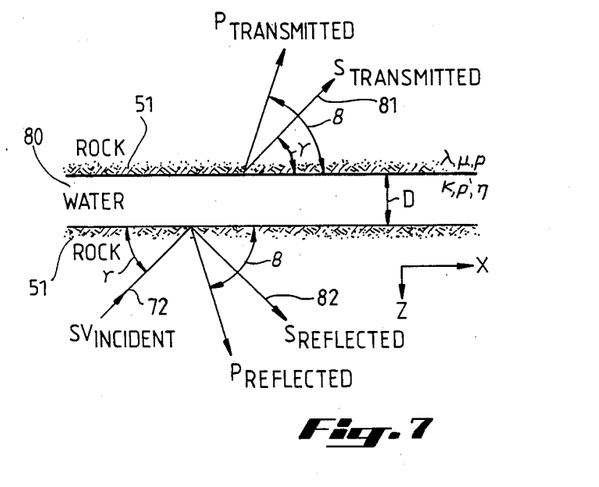
FIG. 7 is a graphic depiction of the geometry of shear waves passing through a fracture or thin bed in a subsurface geological formation.
Figure 8:
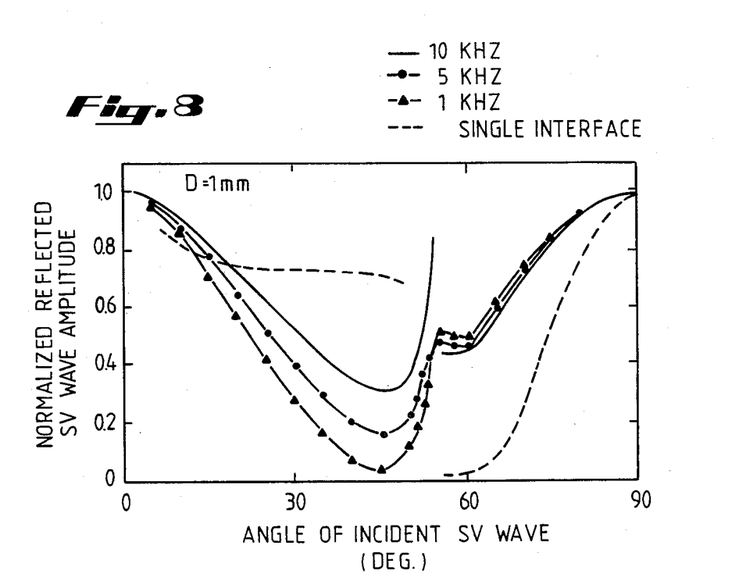
FIG. 8 is a graph plotting shear wave amplitude against shear wave angle of incidence for different frequencies.

With reference now to FIGS. 6–8, the method of the present invention for determining the dip and orientation of a fracture or thin bed in a subsurface geological formation traversed by a borehole will be described. As illustrated in FIG. 6, borehole 50 passes through the subsurface geological formation 51, and a fracture, or thin bed, both being represented by the reference numeral 80, is disposed in formation 51. An extremely useful characteristic of formation 51 would be to know the dip, or angular orientation, and orientation, or location, of the thin bed or fracture 80 in formation 51.

As illustrated in FIGS. 6 and 7, a shear vertical wave (SV) 72 is directed into formation 51, which is comprised of rock and a thin bed or fracture 80 having a thickness D. If there were no fracture or thin bed 80 disposed within formation 51, the attenuation of shear wave 72 would be constant, thus indicating no fracture or thin bed present in the formation at a particular point in borehole 50. However, when there is a fracture or thin bed 80 disposed in formation 51, shear wave 72 will breakdown in two components, a transmitted shear wave 81 and a reflected shear wave 82 as seen in FIGS. 6 and 7.

FIG. 8 illustrates a conventional graph wherein reflected shear wave 82 amplitude is plotted against the incident angle of the shear wave ($\gamma$) for various shear wave frequencies, the graph of FIG. 8 corresponding to known data wherein the thickness D of the fracture or thin bed is 1 mm. Thus, if the shear vertical wave incident angle $\gamma$ can be determined, the dip and orientation of fracture of thin bed 80 can be determined.

The shear vertical wave (SV) incident angle $\gamma$ can be determined in the following manner. As previously described in connection with FIGS. 1 and 2, a logging tool 40 may be passed through the borehole 50, the logging tool 40 having associated therewith a rare earth acoustic transducer 41. Low frequency acoustic energy is generated at a point in the borehole 50 with the rare earth acoustic transducer 41. While operating the rare earth acoustic transducer 41 in a dipole mode at a point in the borehole 50, low frequency acoustic energy is directed into the subsurface geological formation 51 in two alternating directions. The directions are preferably disposed substantially perpendicular to one another. The foregoing alternating orientation of the low frequency acoustic energy from the transducer 41 may be accomplished by mounting the rare earth acoustic transducer within logging tool 40 in association with an orientation device, such as a gyroscope (not shown); or a second rare earth acoustic transducer (not shown) may be disposed in a separate logging tool 40, the rare earth acoustic transducer associated with the second logging tool, being disposed whereby it is offset from the first rare earth acoustic transducer 41 by a substantially 90 degree displacement.

Figure 9:
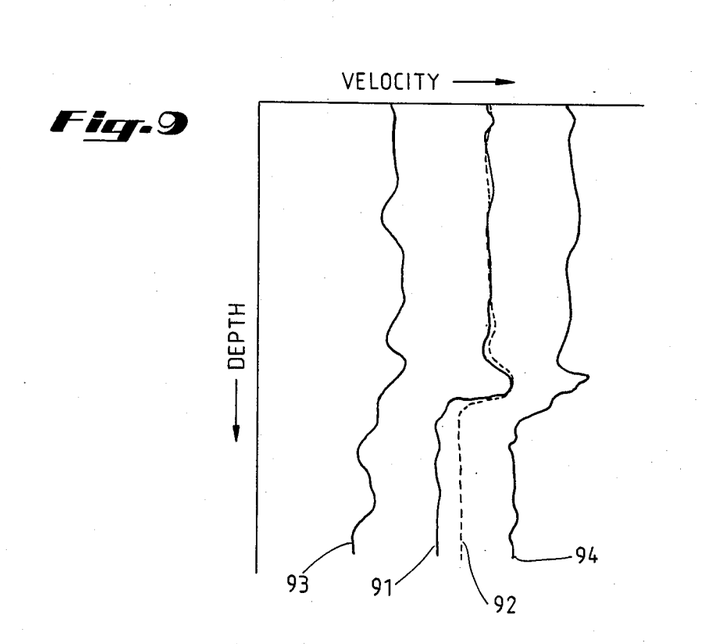
FIG. 9 is a log of wave data for various types of waves, wherein wave velocity is plotted as a function of formation depth.

Acoustic signals are then received at a plurality of receiver stations, such as R1–R8, spaced one from the other and from the rare earth acoustic transducer 41, as shown in FIG. 1. Full shear waveforms are then simultaneously produced for the received signals for the point in the borehole 50. As seen in FIG. 9, the anisotropy of the velocity of the shear waveforms is illustrated. The logs 91, 92 of the two shear waves 72 (FIG. 2) are illustrated, wherein log 91 results from the rare earth acoustic transducer 41 being operated in a first direction, and log 92 results from the transducer 41 being operated in a second direction being substantially perpendicular to the first direction as previously described. The logs 93, 94 of the Stoneley and compressional waves 74, 70 (FIGS. 2) are also illustrated.

The shear waveform reflection and transmission coefficients may then be determined in a conventional manner. For example, as is known, the shear wave transmission coefficient is the ratio of the amplitude of the transmitted shear wave to the amplitude of the incident shear vertical wave. In a conventional manner, the amplitudes of the shear waveforms of FIG. 9 may be measured, whereby the values of the shear waveform amplitudes are combined with the known value of the frequency of acoustic energy to obtain the dip and orientation of the fracture or thin bed. The last combining step may be performed by utilizing the measured shear reflected wave amplitude, the known frequency, and use of a conventional graph such as shown in FIG. 8, whereby the incident angle may be determined. With the incident angle being determined, and the depth of the point in the borehole having been previously measured by the logging tool 40, the dip and orientation of the fracture or thin bed 80 has been determined.

It is to be understood that the invention is not limited to the exact details of construction, operation, exact materials, or embodiments shown and described, as obvious modifications and equivalents will be apparent to one skilled in the art; for example, the logging tool could be passed through the borehole for a first logging run during which the rare earth acoustic transducer is only operated in a monopole mode, and a subsequent logging run could be run wherein the rare earth acoustic transducer is operated only in a dipole mode. cordingly, the invention is therefore to be limited only by the scope of the appended claims.

I claim:

1. A method for determining the permeability of a subsurface geological formation traversed by a borehole, comprising the steps of:
   (a) passing a logging tool through the borehole, the logging tool including a rare earth acoustic transducer;
   (b) generating low frequency acoustic energy at a point in the borehole using the rare earth acoustic transducer;
   (c) receiving acoustic signals at a plurality of receiver stations spaced one from the other and from the rare earth acoustic transducer;
   (d) producing full waveforms of the received signals including shear waves and Stoneley waves for the point in the borehole;
   (e) measuring values of the attenuation of the Stoneley wave and values of the velocity of the shear wave for the point in the borehole; and
   (f) combining the measured values of the Stoneley wave attenuation and the shear wave velocity with other known measured values of borehole characteristics to obtain the permeability of the formation at the point in the borehole.

2. The method of claim 1, including the step of generating the low frequency acoustic energy at the point in the borehole by operating the rare earth acoustic transducer in a monopole mode, when the shear wave velocity is greater than the borehole fluid compressional velocity, to measure values of the velocity of the shear wave.

3. The method of claim 1, including the step of generating the low frequency acoustic energy at the point in the borehole by operating the rare earth acoustic transducer in a dipole mode, when the shear wave velocity is less than the borehole fluid compressional velocity, to measure values of the velocity of the shear wave.

4. The method of claim 1, including the step of operating the rare earth transducer in a dipole mode.

5. The method of claim 1, including the step of operating the rare earth transducer in a monopole mode.

6. The method of claim 1, including the step of operating the rare earth transducer in an alternating dipole and monopole mode.

7. A method for obtaining waveforms indicative of the permeability of a subsurface geological formation traversed by a borehole, comprising the steps of:
   (a) passing a logging tool through the borehole, the logging tool
   (b) generating low frequency acoustic energy at a point along the borehole using the rare earth acoustic transducer;
   (c) receiving acoustic signals at a plurality of receiver stations spaced one from the other and from the rare earth acoustic transducer;
   (d) producing full waveforms of the received signals including a shear waves and Stoneley waves for the point along the borehole; and
   (e) recording the full waveforms an analyzing the full waveforms to determine the attenuation of the Stoneley waves and the velocity of the shear waves, said attenuation and said velocity and other known measured values of borehole characteristics further determining the permeability of said formation at said point along the borehole.

8. The method of claim 7, wherein the full waveforms are analyzed prior to being recorded.

9. The method of claim 7, including the step of operating the rare earth transducer in a dipole mode.

10. The method of claim 7, including the step of operating the rare earth transducer in a monopole mode.

11. The method of claim 7, including the step of operating the rare earth transducer in an alternating dipole and monopole mode.

12. The method of claim 7, wherein continuous compressional wave or shear wave slowness logs are prepared from the waveforms.

13. The method of claim 1, wherein the measured values of the Stoneley wave attenuation and the shear wave velocity are combined with other known measured values of: fluid bulk modulus; shear modulus of the formation; borehole fluid density; fluid saturated formation density; acoustic signal frequency; and viscosity, in accordance with the expressions:

$$a_s = \frac{2\pi^2}{V_s} \frac{\rho_f}{\rho_b} \frac{K\rho_f}{n} f^2$$

$$a_{st} = a_s \frac{B}{B + G}$$

wherein
$a_{st}$ is the Stoneley wave attenuation;
$a_s$ is the formation shear wave attenuation;
G is the shear modulus of the formation;
B is the borehole fluid bulk modulus;
$V_s$ is the formation shear wave velocity;
$\rho_f$ is the pore fluid density;
$\rho_b$ is the fluid saturated formation density;
f is the acoustic signal frequency;
n is the pore fluid viscosity; and
k is the formation permeability.

* * * * *